FIG. 4.

United States Patent Office 3,606,468
Patented Sept. 20, 1971

3,606,468
MACHINES FOR PLANING ROAD-LIKE SURFACES
William James Walker, Pontefract, and John Halbert, Ossett, England, assignors to British Jeffrey-Diamond Limited, Wakefield, Yorkshire, England
Filed Sept. 29, 1969, Ser. No. 861,555
Claims priority, application Great Britain, Oct. 3, 1968, 47,050/68
Int. Cl. E01c 23/09
U.S. Cl. 299—39                    7 Claims

ABSTRACT OF THE DISCLOSURE

A machine for planing a road-like surface includes a cylindrical cutting element incorporating cutting pick means. The cutting element is mounted in said machine for rotation about the longitudinal axis of the element and is mounted in such manner that the cutting pick means can be brought into engagement with the road-like surface.

BACKGROUND OF THE INVENTION

Field of the invention

This invention relates to machines for planing, or removing layers from, road-like surfaces.

Description of the prior art

Hitherto, to the applicants' present knowledge, such machines have used heat for removing layers from road-like surfaces prior to resurfacing or levelling thereof. Disadvantages of these prior art machines are that these machines cannot be used in restricted areas where flames and heat are not permitted such as fuel storage areas, gas storage areas and air-fields, new surfacing materials cannot be laid immediately planing has finished owing to oxidation of the planed surface and the production of excess surface tar, and these machines cannot operate in wet conditions.

The main object of the present invention is to provide a machine for planing a road-like surface in which the aforesaid disadvantages are avoided.

SUMMARY OF THE INVENTION

According to the present invention there is provided a machine for planing a road-like surface, said machine being movable over the surface to be planed and including a cylindrical cutting element incorporating cutting pick means on the curved periphery of the cutting element, the element being mounted in said machine with its longitudinal axis, about which it is rotatable, disposed transversely to the direction of machine movement and in such manner that the cutting pick means may be brought into engagement with said road-like surface, and drive means connected to the cutting element for effecting said rotation.

BRIEF DESCRIPTION OF THE DRAWINGS

In order that the invention may be more fully understood, an embodiment in accordance therewith will now be described by way of example with reference to the accompanying drawings, in which:

FIG. 4 is a schematic line diagram of hydraulic control circuitry for the machine of FIG. 1.

DESCRIPTION OF PREFERRED EMBODIMENT

Figure 1:
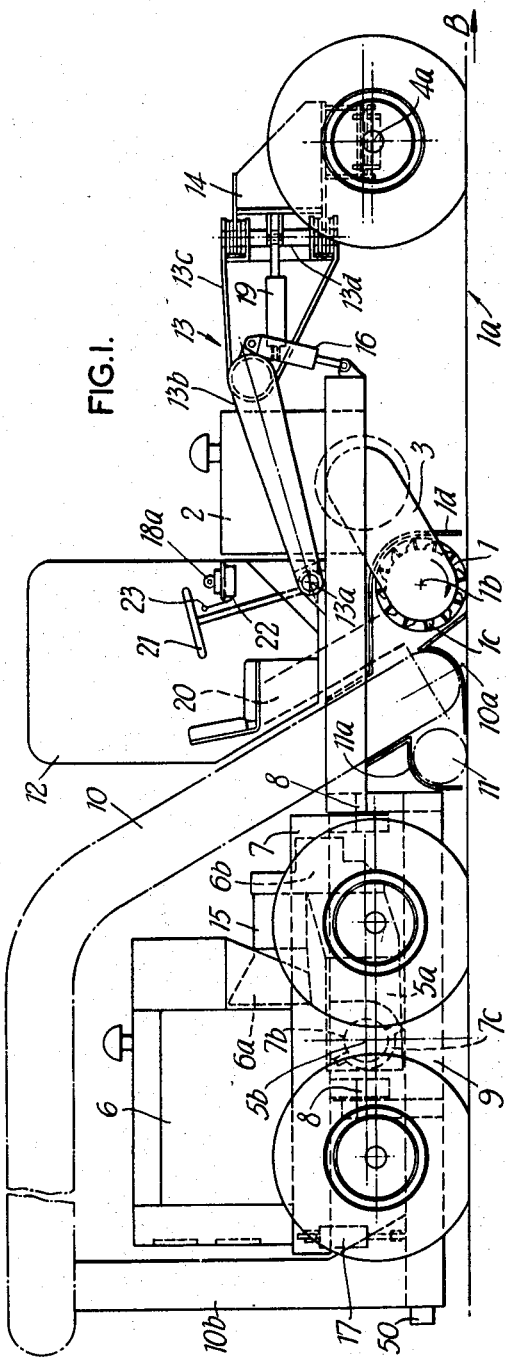
FIG. 1 is a side view of a self-propelled machine for planing a road-like surface, in position for a road-planing operation.
Figure 2:
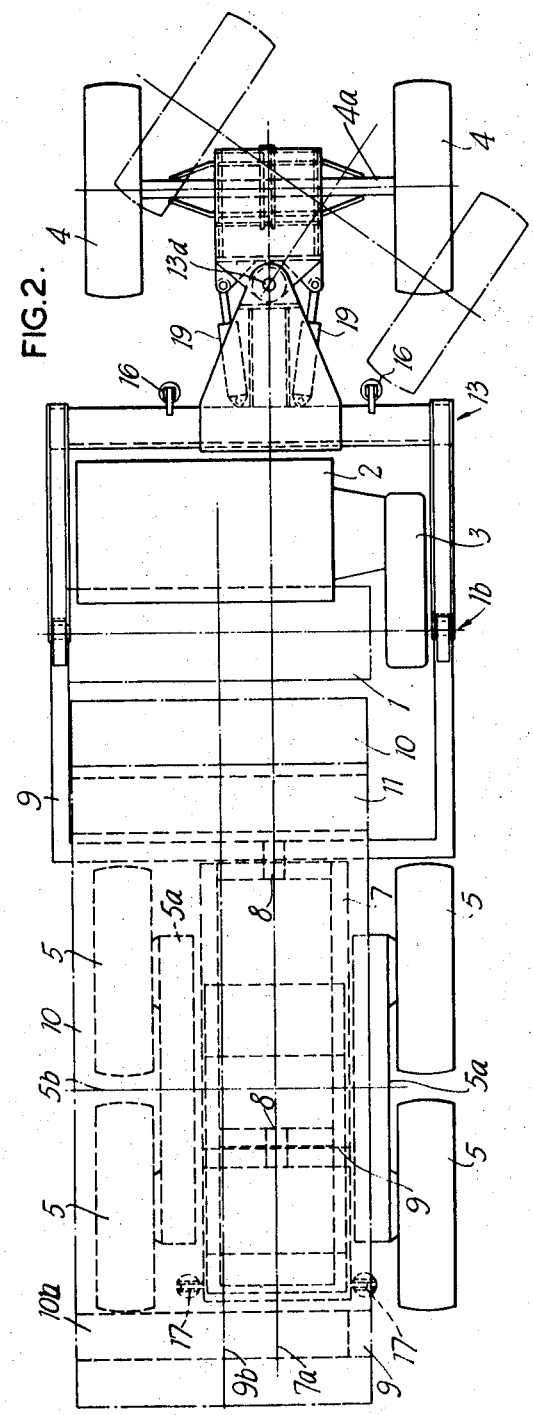
FIG. 2 is a plan view of the machine shown in FIG. 1.
Figure 3:
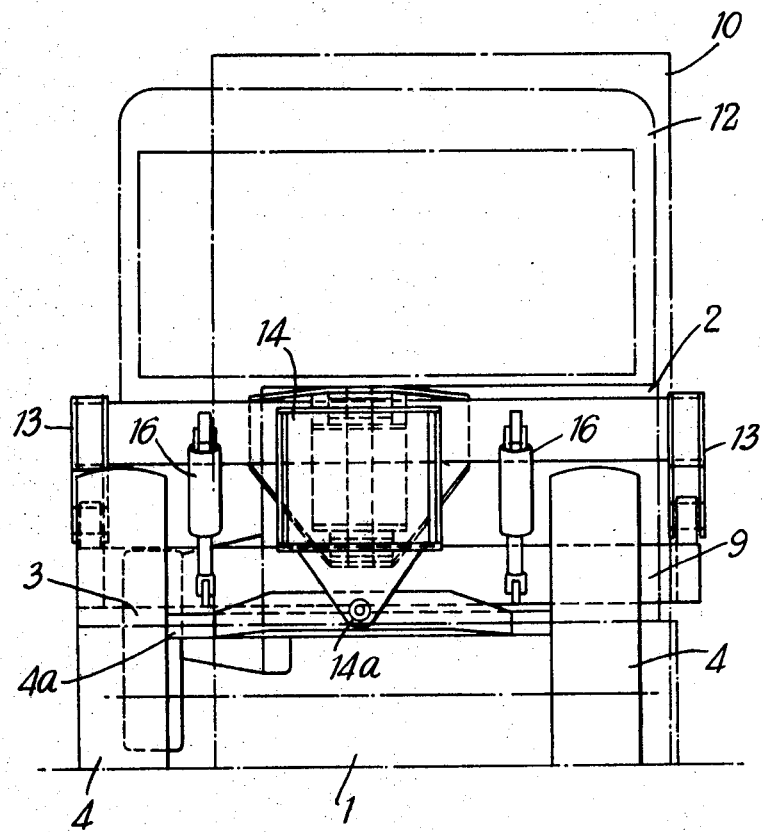
FIG. 3 is a front view of the machine shown in FIG. 1.

Referring to FIGS. 1 to 3 of the drawings, a machine for planing or removing a layer from a road-like surface includes a cylindrical cutting element 1 incorporating cutting pick means on the curved periphery of the cutting element, the element being mounted in said machine with its longitudinal axis 1b, about which it is rotatable, disposed transversely to the direction of machine movement, the cutting element 1 being shown in engagement with a road-like surface constituted by a road 1a and drive means 2, 3 being provided for effecting said rotation. The cutting element 1 is disposed axially across the road 1a and incorporates a drum with the cutting pick means being constituted by a plurality of cutting picks 1c secured to the curved periphery of the drum in a scroll type, cylindrical or other suitable configuration. The distance apart of the respective lines of picks, and the individual cutting picks of the respective lines is chosen so as to be compatible with the degree of finish required for a particular surface, which will, for example, be suitable for the laying of re-surfacing materials such as asphalt. In the case of the scroll type configuration, which is preferred, by way of example, the distance apart of the scroll lines may be in the region of 6 inches whereas the spacing between the individual cutting picks of the respective lines may be in the region of ⅜ inch.

Preferably, the cutting picks are detachably secured in respective adapter boxes which are rigidly secured to the curved periphery of the drum as by welding for example. Thus, each cutting pick 1c may be individually removed from the drum in the event of being subjected to wear or damage. Each cutting pick 1c is preferably tipped with a material capable of resisting wear, a suitable material being tungsten carbide. In the embodiment illustrated the cutting element 1 is in the region of six feet in length and has a diameter of the order of 2 feet. Conveniently, the cutting cylinder 1 is provided with a front guard 1d mounted on the frame.

The drive means 2, 3 for the cutting element 1 is advantageously a variable speed diesel engine 2 (Leyland 520 type) which is mounted on and towards the front end of the central or main frame 9 of the machine. The drive is transmitted from the engine 2 to the cutting element 1 through a reduction gear train 3 (not shown in detail) which connects the cutting element itself with the output shaft of the engine 2. For reasons of compactness of construction the cutting element is mounted in suitable bearings, for example self aligning bearings, on a stationary shaft and is connected to and supported on the central frame 9 through the casing of the gear train 3 and engine 2. Conveniently, the stationary shaft is supported by appropriate brackets (not shown) connected to the central frame. Thus, the cutting element 1, the engine 2 and the gear train 3 form a single unit which may be removed from or mounted on the central frame 9.

Preferably, the direction of rotation of the cutting element 1 is in the direction indicated by the arrow A in FIG. 1 i.e. with the machine moving forwards in the direction of the arrow B the direction of movement of that portion of the curved periphery of the cutting element in engagement with the road 1a at any instant during a planing operation will always be opposite to the direction of movement of the machine. Such a cutting action is referred to as "down cutting." The engine 2 is connected in any suitable manner to driver operated controls mounted on the central frame 9, in the cab 12.

The machine is a self supporting wheeled structure provided with two front steering wheels 4 appropriately mounted for rotation on a stationary axle 4a and two pairs of rear drive wheels 5, the power for which is transmitted from a diesel engined propulsion unit 6, for forward and reverse travel. The drive transmission from the propulsion unit 6, which includes a conventional tandem chain drive 5a (not shown in detail) the axle line of which is indicated at 5b, see FIG. 1, will be described in more detail hereinafter.

The central frame 9 is preferably formed of welded channel-steel sections and comprises a front portion extending forwardly beyond the propulsion unit 6 to support the cutting element 1 with its drive system, the driver's cab 12 housing all the operational controls of the machine and mounted directly above the cutting cylinder 1, and a linkage in the form of a front U-frame assembly generally indicated at 13 which is pivotally connected to the front portion of the frame 9 by two pivots 13a. The pivots 13a are secured in the manner shown to the upper surface, and on opposite sides respectively of the front portion of the frame 9. The centre lines of the pivots coincide, are at right angles to the longitudinal axis of the machine, and are disposed in the vertical plane which contains the longitudinal axis 1b of the cutting element 1, see FIGS. 1 and 2. As will be apparent from FIG. 2, the centre line 9b of the front portion of the central frame and a part 13b of the U-frame assembly 13 are laterally offset on one side relatively to the longitudinal axis 7a of the machine so that the cutting element 1 on this side projects laterally beyond the rear wheels 5, thereby enabling the machine to plane the road close to the road kerbs. A part 13c of the U-frame assembly is rigidly connected to the part 13b and carries at its front end a substantially vertical pivot pin 13d, the centre line of which lies in the plane containing the longitudinal axis of the machine. An end frame constituted by a steering frame 14 is connected to the pivot pin 13d and is connected to the front axle 4a through a substantially horizontal pivot pin 14a for a purpose to be described (see FIG. 3). The central frame 9 also comprises a rear portion disposed beneath the propulsion unit 6. The central frame is supported and suspended by this rear portion from pivot points in the form of substantially horizontal pins 8 depending from another end frame constituted by a sub-frame 7 mounted from and disposed beneath the power unit 6. Suitable bearings are preferably interposed between the pivot points 8 and the co-operating parts of the central frame 9. The centre lines of the sub-frame 7 and the rear portion of the frame 9 coincide with the longitudinal axis 7a of the machine. Preferably, the sub-frame 7 is formed of welded channel-section steel and is of similar width to the rear portion of the central frame 9. The sub-frame 7 is rigidly connected to the axle casing 7b of the tandem drive 5a by a known form of clamping arrangement consisting of two clamps such as 7c disposed symmetrically on opposite sides respectively of the longitudinal axis of the machine. It should be appreciated that in such known tandem drives the four wheels are capable of pivoting upwardly and downwardly as a unit about the axle line of the tandem drive. Thus, by virtue of the sub-frame 7, the main frame 9 together with the sub-frame 7, propulsion unit 6 and cutting element 1 may be caused to pivot about the axle line 5b of the tandem drive 5a by power means to be described.

The propulsion unit 6 is preferably a basic standard mechanical transmission unit such as is used in a conventional motor grader and is conveniently a Leyland 500 unit, but interposed between the clutch housing 6a of the unit and the unit drop gear case 6b is a transfer gear train, a disconnect clutch connected between the propulsion unit output shaft and the gear train and a hydrostatic pump and motor generally indicated at 15. Thus, with the disconnect clutch engaged the propulsion unit 6 gives direct drive through the tandem chain drive 5a to the wheels 5 for high speed travelling purposes e.g. from one operational site to another whereas, with the disconnect clutch disengaged, the road wheels are directly driven through the tandem drive 5a by the unit 6, the transfer gear train and the hydrostatic pump and motor, for low speed travelling purposes during a road planing operation. Thus, for a particular planing operation the speed of movement of the machine and the relative speed of rotation of the cutting cylinder 1 can be selected by the driver in the cab 12, in dependence upon the type and nature of the road-like surface e.g. asphalt or concrete. The propulsion unit 6 is connected in known manner with driver operated controls mounted on the frame 9 in the cab 12. In order to bring the cutting element 1 into and out of engagement with the road 1a, the aforementioned power means include two hydraulic piston and cylinder devices 16 connected between the front end of the central frame 9 and the U-frame assembly 13, the devices 16 being connected or operated through a hydraulic circuit incorporating hydraulic control valves disposed in a main valve block 22 mounted on the central frame 9 in the cab 12, the valves being connected to associated driver actuable levers, of a bank of levers 23 (shown diagrammatically) mounted on the main hydraulic valve block 22 (FIG. 1). The devices 16, when actuated, cause the central frame 9, to pivot upwardly or downwardly, as the case may be, relatively to the longitudinal axis 7a, about the rear axle line 5b, together with the cutting element 1, the cab 12, the sub-frame 7 and the propulsion unit 6. It should be appreciated that pivoting movement of the frame 9 also takes place about the pivot points 13a. Thus the cutting element 1 can be brought into and out of engagement with the road 1a, this arrangement, when operated, giving any required depth of cut which is within the range of the cutting element 1.

In order to incline the cutting element 1 relatively to the longitudinal axis 7a of the machine for the cutting of various cross-falls, further power means are provided and include a pair of hydraulic piston and cylinder devices 17 connected between the rear end of the central frame 9 and the sub-frame 7. The devices 17 are connected to corresponding valves in the main valve block 22 by a suitable hydraulic circuit, corresponding driver actuable levers of the bank of levers 23 being connected to associated ones of said valves. Included in this hydraulic circuit is a sensing limit or other indicating device 18 (see FIG. 4), for selecting the required cross-fall, i.e. angle of inclination of the cutting element 1, which indicator is coupled to an electro-level 18a for a purpose to be described. The devices 17, when operated by the driver, pivot the central frame 9, U-frame assembly 13 and steering frame about the longitudinal axis 7a, i.e. about the pivot pins 8 of the sub-frame 7 and about the pivot 14a connecting the steering frame 14 to the front axle, into the position selected for the cross-fall required. During a planing operation, if, for example, the rear wheels 5 contact an irregular surface such as a pot hole thereby altering the cross-fall selected, then the electro-level 18 automatically operates the devices 17 to pivot the frame 9 and bring the cutting element 1 into the correct position.

Figure 4:
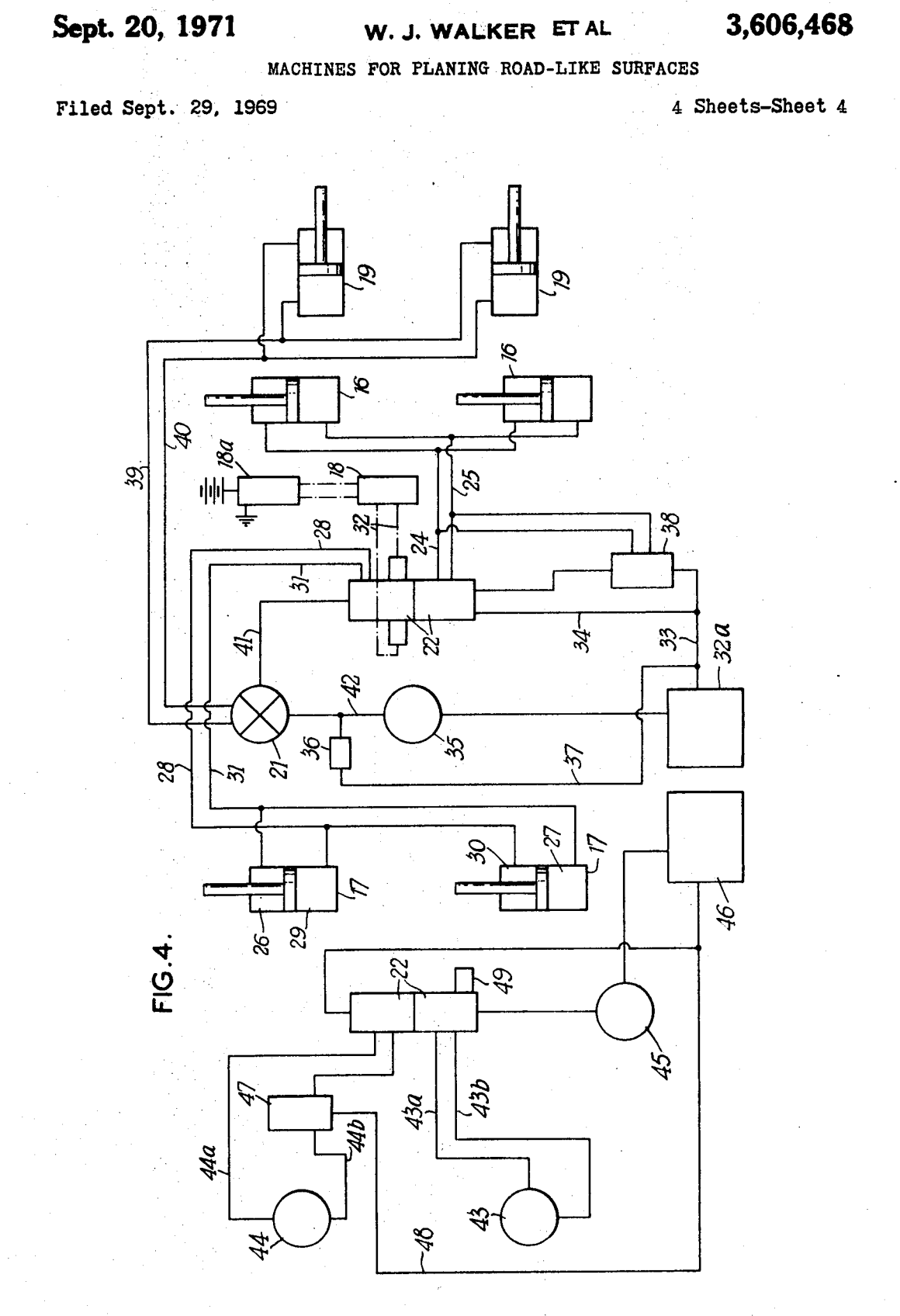

In order to continuously remove the material planed from the road 1a, an elevating conveyor 10 is mounted on the central frame 9 and projects downwardly through the central frame sections so that its material loading end, including a scraper blade 10a, lies adjacent to the cutting element 1 and is disposed between the cutting element 1 and the foremost pair of rear wheels 5. The conveyor 10 extends upwardly and over the power unit 6 with its material discharge end projecting beyond the rear end of the machine and is supported by uprights 10b of the main frame 9. The conveyor drive means includes a hydraulic pump driven by the propulsion unit 6, and a motor which transmit the drive to the conveyor through a worm and wheel reduction gearing (not shown). The conveyor drive means are operated by the driver. The width of the conveyor 10 is similar to that of the cutting element 1 and its centre line is coincident with the centre line of the front portion of the central frame 9. The conveyor 10 may be a plate conveyor or any other appropriate type of conveyor. Preferably, in order to pick up small fines of material, a rotatable cylindrical wire sweeping brush 11 is mounted on the frame 9 at the rear of the conveyor 10 and extends across the full width of the conveyor 10. The brush drive means includes a motor unit which is mounted directly onto the brush centre shaft and which is powered by the conveyor hydraulic pump. The conveyor pump as indicated at 45 and brush motor unit as indicated at 44 in FIG. 4 are driven from the propulsion unit 6 and are controllable from the cab 12. The direction of rotation of the brush 11 is opposite to that of the cutting element 1, the brush acting to deflect material into the material pick up end of the conveyor 10. Advantageously the brush 11 is provided with a rear guard 11a secured to the frame 9. The material picked up by the conveyor 10 during a planing operation may be loaded onto a lorry travelling behind the machine, or alternatively may be loaded onto a truck trailed behind the machine and connected to suitable attachment means 50 (shown diagrammatically) at the rear end of the frame 9.

Preferably, for the suppression of dust, during a planing operation, a pressurised water sprinkler system 20 (shown diagrammatically in dotted lines) which is actuable from the cab 12 is provided.

Steering for the machine is preferably of the pivot-steer type having two hydraulic piston and cylinder devices 19 connected between opposite sides respectively of the U-frame assembly 13 and the steering frame 14. Power for the steering may be transmitted from a hydrostatic pump through either a manual/power system of the type marketed under the trade name "Orbitrol," or a tiller steer, as indicated at 21, to the devices 19.

Braking of the machine whilst in motion is preferably through six hydraulic power assisted wheel brakes (one mounted in each wheel). A transmission parking brake lever is also provided in the cab 12. The braking system may also include a known form of hydrostatic retardation means.

Referring now to FIG. 4, this shows, in schematic form, one arrangement of the hydraulic circuitry which may be used for controlling the movement of the central frame 9, operation of the respective drive means for the conveyor 10 and wire brush 11 and operation of the steering from the cab 12 by the driver of the machine. The devices 16 for effecting upward and downward movement of the central frame 9 are connected to respective valves disposed in the main valve block 22 by hydraulic conduits 24 and 25 respectively. The conduits 24 and 25 branch to supply hydraulic fluid to the upper and lower chambers respectively of the cylinders of the two devices 16, which are double acting.

The devices 17 for pivoting the frame 9 about the longitudinal axis 7a (FIG. 2) are also double acting, the upper and lower cylinder chambers 26 and 27 of the respective devices 17 being connected to the associated control valve in the main valve block 22 through a hydraulic conduit 28, whereas the lower and upper cylinder chambers 29 and 30 of the respective devices 17 are connected through a hydraulic conduit 31 to the associated control valve in the valve block 22. The sensing limit 18 and electro-level 18a connected thereto are connected through electric cables 32 and valves in the valve block 22 to the hydraulic conduits 28 and 31. Hydraulic fluid for the devices 16 and 17 is supplied from a hydraulic oil tank 32a through conduit 33 and 34 by a hydraulic pump 35, driven by the propulsion unit 6 (connections not shown), through a relief valve 36 and a conduit 37. A further hydraulic valve block 38 may be optionally connected between the conduits 24 and 25 to the respective devices 16 and the valve block 22, by the illustrated hydraulic conduits. The valve block 38 enables the position of the cutting element relatively to the road to be controlled through levers mounted thereon by an operator walking alongside the machine during a planing operation and closely observing the surface planed.

The steering piston and cylinder devices 19 which are double acting, are connected by hydraulic conduits 39 and 40 to the "Orbitrol" steering unit 21 which is in turn connected to associated control valves in the main valve block 22 and to the pump 35 through hydraulic conduits 41 and 42 respectively, hydraulic fluid being supplied from the tank 32a.

The hydraulic circuitry for the drive means of the conveyor 10 and wire brush 11 will now be described. The conveyor and brush motors 43 and 44 are respectively connected to associated control valves in another portion of the main valve block 22 through hydraulic conduits 43a, 43b, and 44a, 44b respectively. A hydraulic pump 45 driven by the power unit 6 (connection not shown) and connected in the circuit by hydraulic conduits in the manner shown, drives oil from a hydraulic oil tank 46 to the motors 43 and 44 through the valve block 22. A flow control valve 47 is connected in the conduit 44b between a return flow conduit 48 to the tank 46, and the valve block 22. Advantageously, a relief valve 49 is connected to this portion of the main valve block 22. The individual levers of the bank of levers 23 mounted in the valve blocks are connected to the respective control valves to enable the driver in the cab 12 to control the operation of the various parts of the machine described.

It should be appreciated that more than one cutting element 1 may be mounted on the machine but the embodiment described using one cutting element is preferred.

In cases where a cutting element of smaller length, than that described, for example, three feet, one or two hydrostatic motors with suitable gear reduction may be used instead of the cutting element drive means described and connected to motor actuation means in the form of a power unit consisting of a hydrostatic pump and hydraulic oil tank. In this case the, or each, motor is mounted on the centre shaft of the cutting element.

The invention also comprehends a manually propelled machine which may, for example, be used for planing the road-like surface around manholes. In this case the cutting element drive means is conveniently as described in the previous paragraph.

By the present invention is provided a machine which can efficiently and easily plane or remove layers from a road-like surface such as a road, car park, aircraft runway or like areas without using heat which has hitherto been used. Moreover, such a machine obviates the disadvantages arising out of the use of heat so that the machine can operate in wet conditions, there is neither oxidation of the planed surface nor the production of excess surface tar i.e. when the road-like surface consists of asphalt for example, htereby allowing new carpeting or road-surfacing materials to be laid immediately planing has finished, and the machine can work in restricted areas where flames and heat are not permitted, for example, fuel storage areas, gas storage areas and airfields.

We claim:

1. A machine for planing a road-like surface, said machine being movable over the surface to be planed and comprising:
   (a) a central frame supported by wheels at opposite ends of the frame;
   (b) a cylindrical cutting element incorporating cutting pick means, the cutting element being mounted on said central frame for rotation about the longitudinal axis of the element and transversely to the direction of machine movement;
   (c) drive means for effecting rotation of the cutting element;
   (d) a first end frame carrying the wheels at one end of the central frame and being connected to the central frame by a linkage;
   (e) a second end frame carrying the wheels at the other end of the central frame and being connected to the central frame, said wheels being arranged in two pairs on opposite sides respectively of the machine;

(d) propulsion means for said machine including a tandem drive unit which is connected to said two pairs of wheels and which carries, and is pivotally connected to, the second end frame, the linkage connection between the first end frame and the central frame and the connection between the tandem drive unit and the second end frame being capable of permitting pivotal movement of the central frame together with the second end frame in a generally vertical plane extending lengthwise of the machine;

(e) power means connected to said central frame for effecting said pivotal movement to bring the cutting pick means into and out of engagement with said road-like surface;

(f) pivot means between the wheels on said first end frame and said first end frame itself and between the second end frame and the central frame whereby the central frame and longitudinal axis of the cutting element may be inclined relatively to the surface being planed, the pivot means between the second end frame and the central frame including one or more pivots extending lengthwise of the machine; and (g) power means connected to the central frame for effecting such inclination.

2. A machine as set forth in claim 1, wherein the first end frame is connected to the linkage by a single central pivot which is co-incident with the longitudinal axis of the machine and which permits steering movement of the wheels on the first end frame.

3. A machine as set forth in claim 1, wherein the power means for effecting relative movement between the central and first end frames, and the power means for effecting inclination of the cutting element relative to the surface being planed, include hydraulic piston and cylinder devices connected between the central frame and linkage and between the central and second end frames.

4. A machine as set forth in claim 1, wherein the cutting element includes a drum and a plurality of cutting picks which are removably mounted in respective adapter boxes, which boxes are rigidly secured to the curved periphery of the drum.

5. A machine as set forth in claim 1, wherein the propulsion means includes a main propulsion unit connected to said tandem drive unit and incorporating an internal combustion engine, main clutch and gear box, there being a transfer gear and a further disconnect clutch between the main clutch and gear box and a hydrostatic pump and motor connected between the transfer gear and the gear box whereby the main drive to said gear box may be disconnected and taken through said hydrostatic pump and motor to reduce the speed of movement of the machine, for a planing operation.

6. A machine as set forth in claim 5, and further including a conveyor mounted on the central frame, which conveyor projects downwardly through the central frame with its material loading end disposed between the cutting element and the wheels remote from said first mentioned end frame and which extends upwardly and over the propulsion unit, which is carried by the tandem drive unit, with its material discharge end projecting beyond that end of the machine, drive means being provided for driving the conveyor.

7. A machine as set forth in claim 6, wherein a rotatable cylindrical wire sweeping brush is disposed between the material loading end of the conveyor and the tandem drive wheels, drive means being provided for rotating the brush in a direction which is opposite to that of the cutting element.

References Cited

UNITED STATES PATENTS

| 2,062,232 | 11/1936 | Pogue | 299—39X |
| 2,197,549 | 4/1940 | Hargrave et al. | 299—39X |
| 2,817,275 | 12/1957 | Lenker | 299—39 |
| 3,266,846 | 8/1966 | Luksch et al. | 299—39 |
| 3,414,327 | 12/1968 | Austin | 299—39X |

FOREIGN PATENTS

| 789,903 | 1/1958 | Great Britain | 299—39 |

ERNEST R. PURSER, Primary Examiner